US011288793B2

(12) United States Patent
Schumann et al.

(10) Patent No.: US 11,288,793 B2
(45) Date of Patent: Mar. 29, 2022

(54) METHOD FOR DETERMINISTIC IMAGE INSPECTION OF PRINTED PRODUCTS OF A MACHINE FOR PROCESSING PRINTING SUBSTRATES

(71) Applicant: HEIDELBERGER DRUCKMASCHINEN AG, Heidelberg (DE)

(72) Inventors: Frank Schumann, Heidelberg (DE); Jan Krieger, Heidelberg (DE); Bennet Carstensen, Sandhausen (DE); Peter Eisele, Oestringen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/174,718

(22) Filed: Feb. 12, 2021

(65) Prior Publication Data

US 2021/0256678 A1 Aug. 19, 2021

(30) Foreign Application Priority Data

Feb. 13, 2020 (EP) .................................... 20157140

(51) Int. Cl.
*G06T 7/00* (2017.01)
(52) U.S. Cl.
CPC .... *G06T 7/001* (2013.01); *G06T 2207/30144* (2013.01)
(58) Field of Classification Search
None
See application file for complete search history.

(56) References Cited

U.S. PATENT DOCUMENTS

| 9,892,502 | B2 | 2/2018 | Schumann | |
|---|---|---|---|---|
| 2006/0027768 | A1* | 2/2006 | Pearson | B41F 33/0081 250/559.44 |
| 2013/0148987 | A1* | 6/2013 | Arakawa | G06K 9/3216 399/15 |
| 2017/0177962 | A1* | 6/2017 | Yamazaki | B41J 29/46 |
| 2019/0001664 | A1* | 1/2019 | Yamazaki | G01N 21/892 |

FOREIGN PATENT DOCUMENTS

| DE | 102016203392 B3 | 6/2017 |
|---|---|---|
| EP | 3456535 A1 | 3/2019 |
| JP | 2010249565 A | 11/2010 |

* cited by examiner

*Primary Examiner* — David Perlman
(74) *Attorney, Agent, or Firm* — Laurence A. Greenberg; Werner H. Stemer; Ralph E. Locher (57) ABSTRACT

A method for inspecting printed products of a machine for processing printing substrates includes recording and digitizing produced printed products by using at least one image sensor and analyzing the printed products by using a computer to find potential defects. Defects in the printed products are detected by the computer by comparing the recorded and digitized printed image with a digital reference image, analyzing occurring deviations, and marking defective printed products in a manner suitable for removal. The computer spatially subdivides every digitized printed image into regions with deviations, calculates the time required to analyze every one of the regions, and terminates the analysis of a digitized printed image when the time required to analyze the regions exceeds a predefined value of time per digitized printed image.

6 Claims, 5 Drawing Sheets

METHOD FOR DETERMINISTIC IMAGE INSPECTION OF PRINTED PRODUCTS OF A MACHINE FOR PROCESSING PRINTING SUBSTRATES

CROSS-REFERENCE TO RELATED APPLICATION

This application claims the priority, under 35 U.S.C. § 119, of European Patent Application EP 20157140.3-1014, filed Feb. 13, 2020; the prior application is herewith incorporated by reference in its entirety.

BACKGROUND OF THE INVENTION

Field of the Invention

The invention relates to a method for inspecting printed products in which the inspection is carried out as a function of an estimated evaluation effort of detected potential image defects.

The technical field of the invention is the field of digital quality control.

When printed products are produced in printing presses of appropriate size, the quality of the products is often controlled by image inspection methods. In most cases, those methods rely on image recording systems and their image sensors, mostly cameras, which are disposed downstream of the last printing unit inside the printing machine. The inspection must be fast enough to keep up with the printing speed. Therefore only a clearly defined window of time is available for the inspection of a printed product such as a printed sheet. If there are very many or very large print defects on a printed sheet, the allotted period of time available for analyzing and assessing detected print defects is exceeded. For in most cases, image inspection does not only include finding deviations from a so-called good or reference image, but also analyzing the detected defects to ensure that the detected deviations actually are print defects and not errors made by the image recording system, for instance. In such a case, there are two options. As a first option, the detected print defects that have not yet been analyzed are analyzed nonetheless, causing the image process to lag behind in an uncontrolled way since the inspection is busy processing print sheets that have already been printed while the printing machine has long since moved on to producing the next prints. The second option is that the image inspection process is simply terminated when the time allotted to a sheet has passed, which means that print defects that have not yet been analyzed remain undetected. Since both processes are detrimental to the quality of the image inspection process, an option to avoid those disadvantages is desirable. Thus an approach needs to be found to prevent the image inspection process from exceeding the allotted time per print sheet and to simultaneously detect all print defects that occur.

BRIEF SUMMARY OF THE INVENTION

It is accordingly an object of the invention to provide a method for deterministic image inspection of printed products of a machine for processing printing substrates, which overcomes the hereinafore-mentioned disadvantages of the heretofore-known methods of this general type and which ensures reliable image inspection.

With the foregoing and other objects in view there is provided, in accordance with the invention, a method for inspecting printed products of a machine for processing printing substrates by using a computer and at least one image sensor for recording and digitizing produced printed products, the computer analyzing the printed products to find potential defects by comparing the recorded digitized printed products with a digital reference image and by analyzing occurring deviations, marking defective printed products in a suitable way for them to be removed, and the computer spatially subdividing every digitized printed product into regions with deviations, calculating the time required to analyze every one of these regions, and terminating the analysis of a digitized printed product when the time required to analyze the regions exceeds a predefined value of time per digitized printed product.

This dynamic adaptation of the inspection process to the time required for every printed image to be inspected ensures that the time frame available for the assessment of every printed image is no longer exceeded. It is true that in accordance with the invention, if very many smaller deviations occur that might represent corresponding image defects, not all of the deviations may be examined in a corresponding way to find out whether they truly are actual print defects or merely deviations that do not represent print defects. However, this is definitely preferable to an uncontrolled timeout. In addition, in practice, the method of the invention leaves only a small portion of the deviations that have not yet been processed without detailed examination and causes these deviations to be marked as image defects in an automated way. In addition, it is safe to assume that when such a massive number of deviations occurs that need to be examined to find out whether they are print defects, the printed image in question will be unusable waste in most cases anyway or there is a massive defect in the image inspection system.

Advantageous and thus preferred further developments of the method will become apparent from the associated dependent claims and from the description together with the associated drawings.

Another preferred development of the method of the invention in this context is that for every one of the regions, the computer calculates the time required for the analysis of every region immediately before examining that region, terminates the examination of the current digitized printed product when the predetermined value of time is exceeded, and marks the deviations in regions that have not yet been analyzed as print defects. This process is the most efficient approach to a dynamic image inspection process because it involves a successive processing of all deviations found in the printed image and the time required for the current region to be processed is not calculated until immediately before the start of the calculation, a fact which ensures that a potential termination of the image inspection due to the fact that the predefined time frame for image inspection on the current printed image is exceeded only occurs when the algorithm is close to exceeding this target time.

A further preferred development of the method of the invention in this context is that the computer calculates the time required for the analysis of all deviations before the analysis starts, only analyzes the current printed product in regions for which there is sufficient time in terms of the predefined time, and marks the deviations in non-analyzed regions as print defects. As an alternative to calculating the required time for processing a current region immediately before the start of the processing of the region in question, it is of course possible to calculate the time immediately after the subdivision into regions with respective deviations and then simply to decide how many regions may be processed by comparing the predefined time frame/value and the total amount of time required for the individual regions. This process may be slightly more inaccurate on the whole, but is advantageous in that it allows prioritizing of the order in which the respective regions are to be examined in more detail on the basis of the calculated time requirements for the individual regions.

An added preferred development of the method of the invention in this context is that the comparison of the recorded digitized printed image and a digital reference image is done by creating a differential image between the printed image and the reference image and analyzing the differential image created in this way. The creation of a differential image between the recorded digitized printed image and a digitally available reference image represents one of the simplest ways of detecting potential deviations and thus existing print defects. In the context of the method of the invention, it is irrelevant whether the reference image is a good image that has been available in digital form from the start and has potentially been created on the basis of print preparation data or whether it is a printed good image that has been taught in.

An additional preferred development of the method of the invention in this context is that the spatial subdivision of every digitized printed product into regions with deviations is achieved by isolating regions with deviations in the differential image when the differential image is analyzed. Regions with deviations can easily be found in the differential image, thus allowing the spatial subdivision of the digitized printed product to be done in a very efficient way.

Another preferred development of the method of the invention in this context is that regions with deviations of a lower filling grade in the differential image are subdivided into individual smaller regions to be analyzed and/or in that the computer carries out position correction for these regions in the recorded digitized printed image and/or in the reference image. In this context, the filling grade is defined as the ratio between pixels with deviations in the differential image and the total number of pixels in the surrounding region of the deviation. A low filling grade thus means that existing objects in the printed image/reference image only differ/deviate to a small degree. This frequently occurs due to a slight shifting of the objects in the recorded and digitized printed image compared to the same objects in the reference image. This shift may be eliminated by a position correction process. Since the deviation in the differential image caused by a shift are on a large scale but only take up a small area, i.e. have a low filling grade, in such a case it makes sense additionally to subdivide the large-scale region with a deviation in the differential image into individual smaller regions and to analyze these smaller regions individually.

A further preferred development of the method of the invention in this context is that regions with deviations of a high filling grade in the differential image are not further analyzed and are marked as print defects. If there are regions with a high filling grade, this means that there are very pronounced deviations between individual objects in the printed and reference images. Such deviations may not be eliminated by position correction. This may occur, for instance, if the wrong reference image or a wrong part of the reference image is compared to the respective printed image. In such a case, further analysis of the deviation to identify a print defect is unnecessary because it is clear that either the deviation is a massive print defect or, in a case of a wrong reference image or reference image part, there is a massive image inspection system/process defect.

An added preferred development of the method of the invention in this context is that the analysis of the image products that have been produced is carried out by the computer in two steps, the first one of which takes a period of time that fluctuates only slightly and the second one of which includes the analysis of the subdivided regions and is highly variable in terms of the required period of time, causing the calculation of the time required for the analysis only to be made for the second step. The first step, which takes a relatively constant amount of time, includes the creation of the differential image and further parts of the image inspection process. Since the time available for this first part accordingly stays constant, this period of time does not need to be calculated because it is known anyway. In comparison, the processing of the subdivided regions of the differential image/of the print and reference image is very variable and may therefore be calculated in accordance with the invention. In addition to the type of deviation in the individual regions that need to be analyzed in a corresponding way, a decisive factor in terms of the variability of the second step of the method is the infrastructure available for the analysis carried out by the computer. Serial processing by using a CPU, for instance, is much easier and more accurate to calculate than a parallel processing by using a GPU. The infrastructure available on the computer and the use thereof thus also have a decisive influence on the implementation of the method of the invention.

An additional preferred development of the method of the invention in this context is that the method is implemented for every one of the at least one sensors separately, allowing time saved when a printed product digitized by an image sensor is processed to be flexibly used by the computer for the processing of digitized printed products of potential further image sensors. Since in most cases the image inspection system or image recording system to be used furthermore is formed of multiple image sensors/cameras and since the corresponding method of the invention therefore needs to be carried out separately for each one of these image sensors, when a printed image recorded by a specific image sensor is analyzed, time may be saved as a function of the type of deviation to be analyzed and the available infrastructure because the analysis has not used up the entire allocated amount of time. Such time savings may then be used as required when the method of the invention is carried out for another image sensor and the printed image it has recorded and digitized. In such a case, the computer that is used in the process allocates the saved time.

A concomitant preferred development of the method of the invention in this context is that the at least one image sensor is part of an inline inspection system in a sheet-fed printing machine and the image inspection system analyzes the produced printed sheets as printed products in the sheet-fed printing machine for sheets that have been marked as defective to be removed by using a waste deflector. The method of the invention is preferably used in inline inspection systems that are part of a printing machine and analyze corresponding printed sheets as printed products. An additional advantage thereof is that the printed sheets that have been marked as defective may immediately be removed in an automated way by using a waste deflector that is provided in most sheet-fed printing machines. Alternatively, it is possible to mark defective products in the delivery, for instance by using a strip, and to have printed sheets that have been marked in a corresponding way removed either manually by the operator or in a downstream automated process.

Other features which are considered as characteristic for the invention are set forth in the appended claims.

Although the invention is illustrated and described herein as embodied in a method for deterministic image inspection of printed products of a machine for processing printing substrates, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
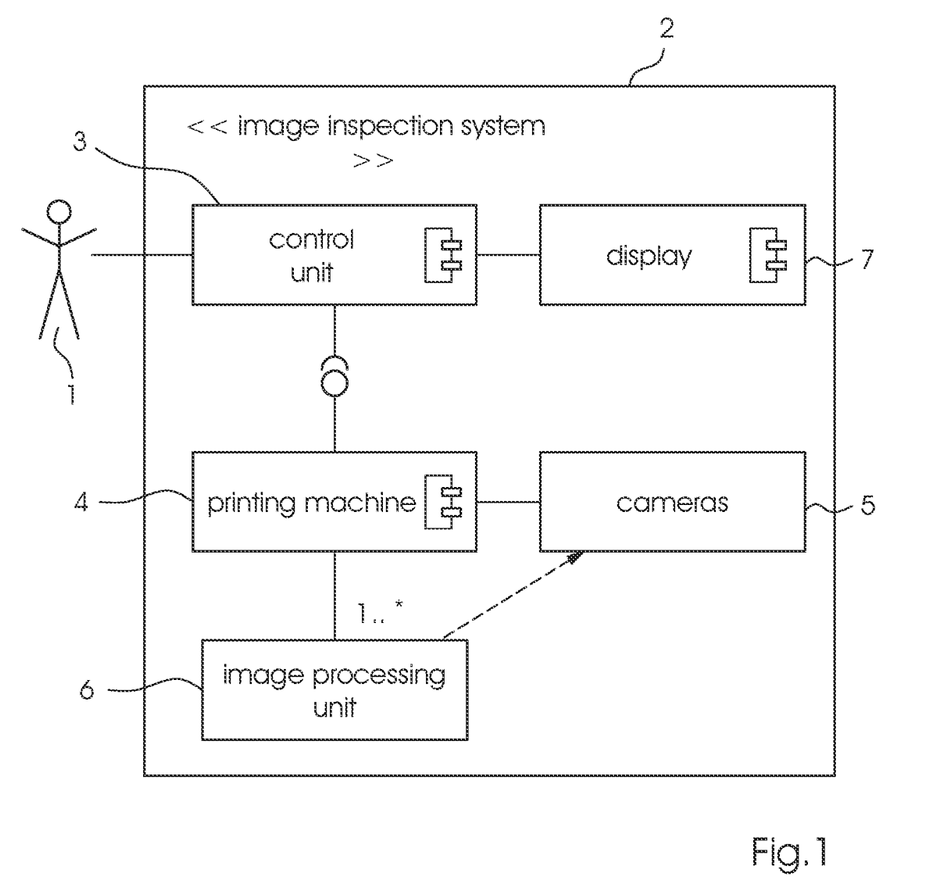
FIG. 1 is a block diagram of an example of the configuration of an image recording system for image inspection purposes.

Referring now in detail to the figures of the drawings, in which mutually corresponding elements have the same reference symbols, and first, particularly, to FIG. 1 thereof, there is seen an example of an image recording system 2 implementing the method of the invention. The system is formed of at least one image sensor 5, usually a camera 5, which is integrated into A sheet-fed printing machine 4. The at least one camera 5 records the printed images generated by the printing machine 4 and transmits data to a computer 3, 6 for analysis. This computer 3, 6 may be a separate computer 6, e.g. one or more dedicated image processors 6, or it may be identical with the control unit 3 of the printing machine 4. At least the control unit 3 of the printing machine 4 has a display 7 for displaying the results of the image inspection process to an operator 1.

Figure 5:
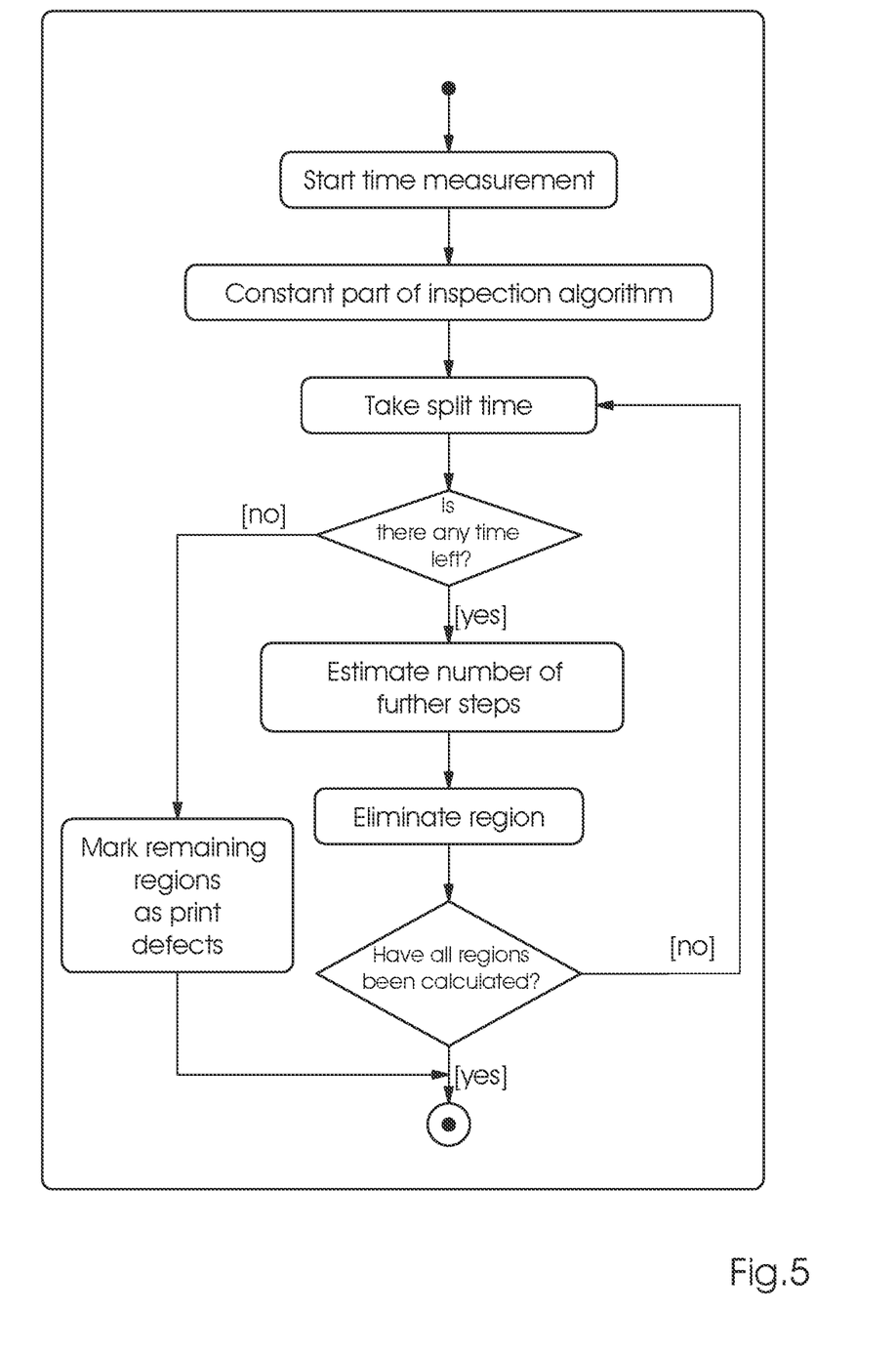
FIG. 5 is a flow chart of the method of the invention.

The method of the invention is schematically illustrated in FIG. 5. In order to understand the foundations of the invention, one needs to be aware of the fact that after some preliminary processing steps, virtually every sheet inspection identifies deviations 11, 11a, 11 b with the aid of a differential image 10, 10a, 11 b between a reference image 8, 8a, 8b and a camera image 9, 9a, 9b. In most cases, all deviations 11, 11a, 11 b that have been identified are subsequently subjected to a local position correction process to eliminate pseudo defects that are caused by position tolerances. Since the time available for elimination is limited, however, two potential problematic cases may arise:

Case 1: There are some very large image defects 11, 11a caused, for instance, by the wrong reference image 8. Yet when they are processed by using a GPU on a graphics card of the image processing computer 6, those few large deviations 11, 11a may not be distributed in such a way that the GPU is efficiently used to capacity.

Case 2: There are too many deviations 11b for them to be eliminated within the predefined time. In most such cases, there are many very small deviations 11b.

A combination of both cases is likewise possible. In the following paragraphs, the two cases are treated separately.

If there are large deviations 11, 11a as in Case 1, there are two scenarios:

Case 1a: An entirely wrong image was used. This means that many large deviations 11 with a high filing grade are created. In this context, the filling grade is understood as the ratio between pixels with deviations 11 and the number of pixels in the surrounding rectangle of the deviation 11.

Case 1b: There are one or more large sharp-edged object(s) that have not been properly aligned. This means that a large deviation 11a with a low filling grade is created, namely only a thin deviation at the edge of the object.

The method of the invention is based on the concept of not doing local position correction because in Case 1a, local position correction will not have any positive effect anyway. In Case 1 b, local position correction might have a positive effect. In accordance with the invention, a differentiation between the two cases is made on the basis of the filling grade of the deviations 11, 11a. This will be explained below in a corresponding way on the basis of examples for every case.

Figure 2:
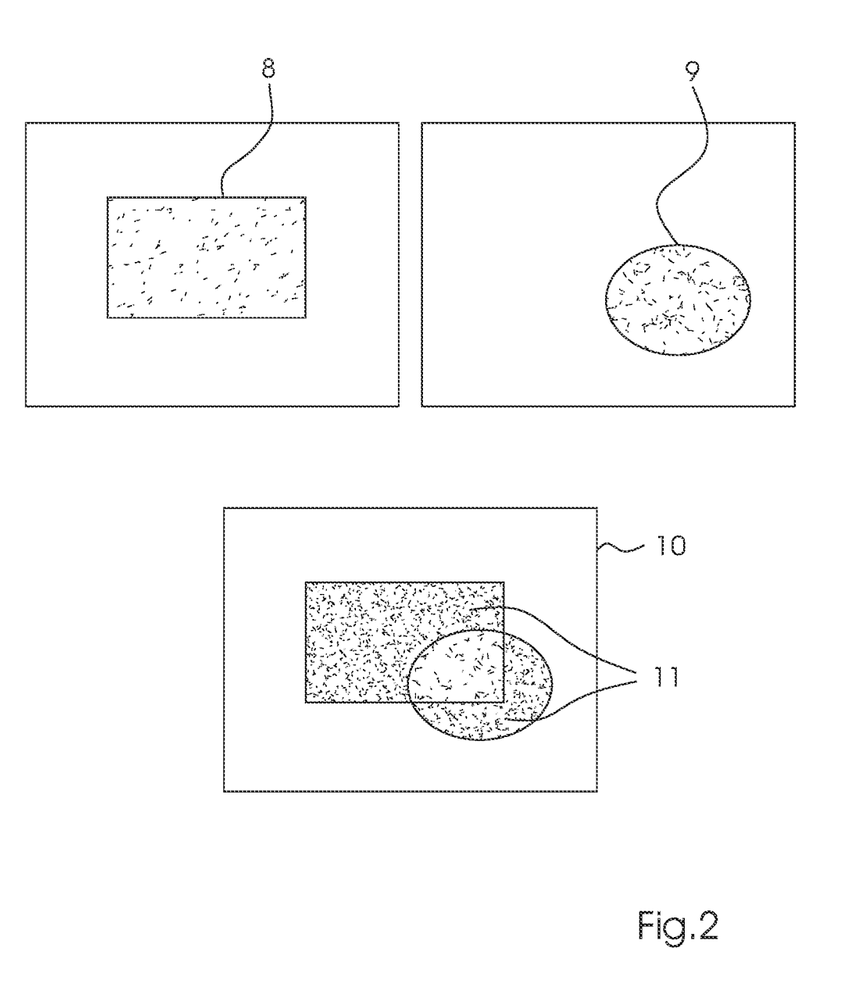
FIG. 2 is a group of plan views showing an example of a differential image with a low filling grade.

Example of Case 1a:

As shown in FIG. 2, two large merging deviations 11 occur in the differential image 10. Each one of them has a high filling grade and is marked in FIG. 2. The differential image 10 is created by subtracting the target/reference image 8 shown at the top left in FIG. 2 from the actual printed image 9 that has been generated by the image recording system 2 and is shown at the top right in FIG. 2. Since the wrong image would make any local position correction useless in this case anyway, the computation time required for such a correction may be saved. Something like this will always be an image error—in this case it may either be the wrong recorded printed image 9 or the wrong reference image 8.

Figure 3:
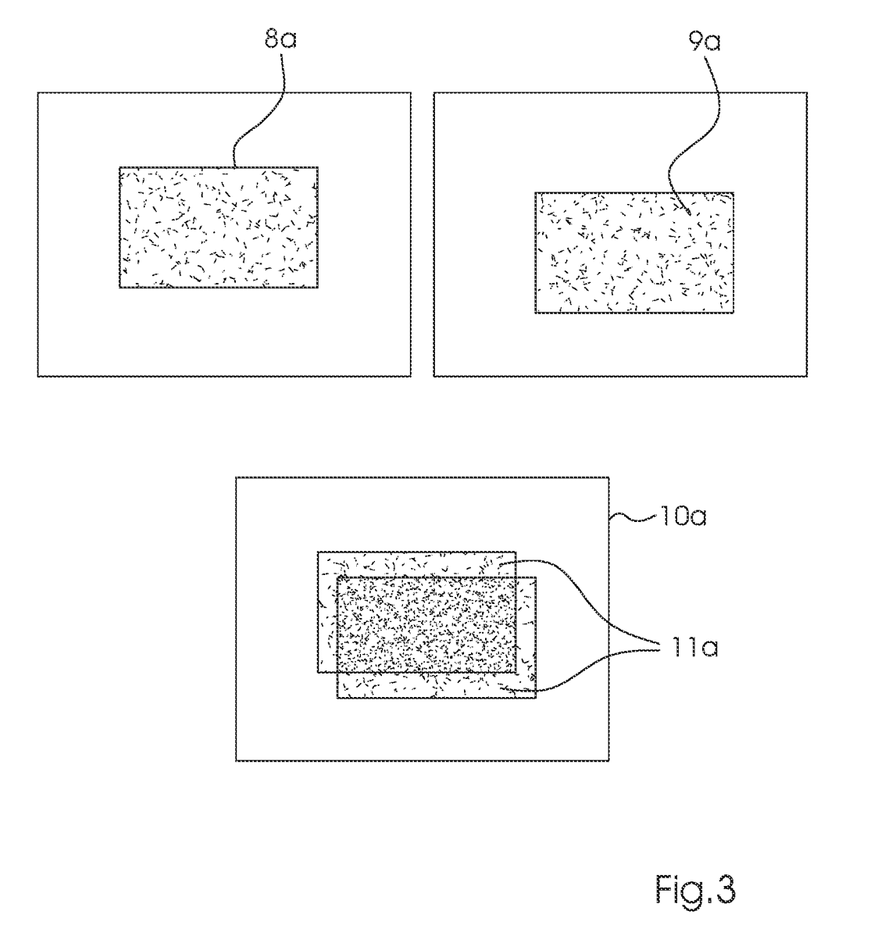
FIG. 3 is a group of plan views showing an example of a differential image with a high filling grade.

Example of Case 1 b:

As shown in FIG. 3, two large merging deviations 11a occur in the differential image 10a. Each one of them has a low filling grade and is likewise marked. In this case, local position correction would cause the deviations 11a to be eliminated in a desired way. In order to optimize Case 1b for the GPU used for the analysis and thus to reduce computing time, the two large deviations 11a are subdivided into a number of small deviations because it is more efficient for a GPU to process a number of small deviations in parallel. This means that Case 1b is converted to Case 2. Alternatively, it is additionally possible to calculate the piecemeal deviations on a CPU of the image recording computer because the CPU algorithm is optimized for precisely this type of deviations, namely an optimum match at position 0.

Thus, it is clear that all possibilities that occur in an image inspection process and are Case 1 may be converted into a Case 2 (like Case 1b) or need not even be further processed (like Case 1a).

Figure 4:
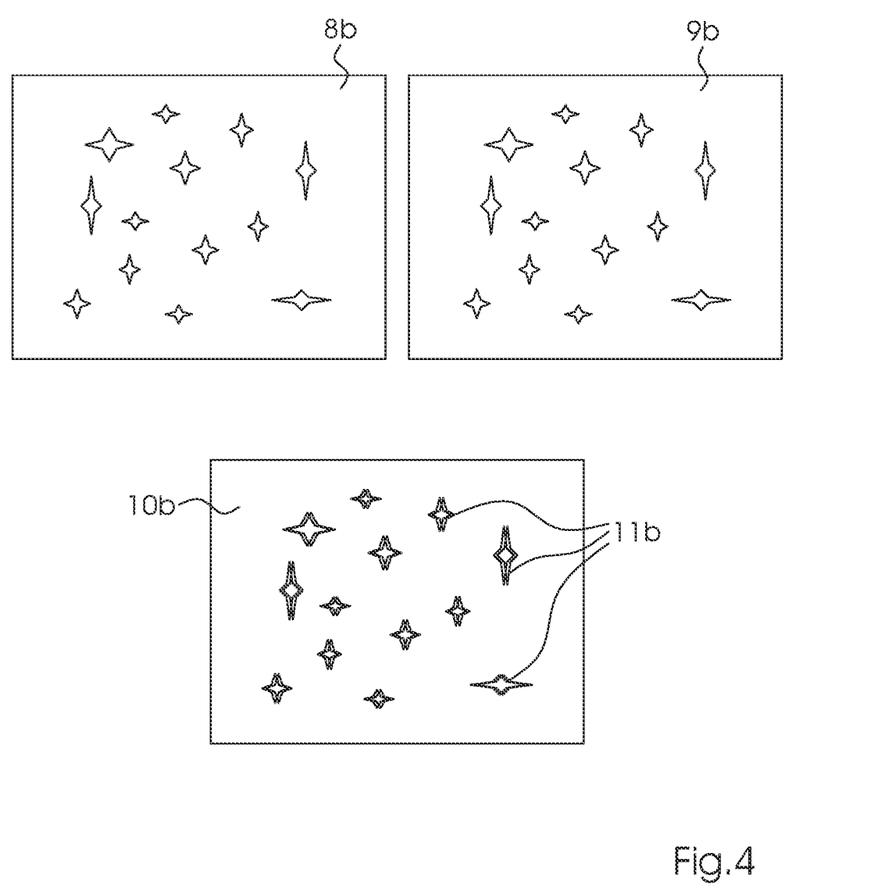
FIG. 4 is a group of plan views showing an example of a differential image with many deviations.

An example of Case 2, which is the one mainly to be processed and in which a large number of very small deviations 11b occurs from the start, is in turn shown in FIG. 4.

The method of the invention is now carried out for every contributing camera/image sensor 5 of the image recording system 2. For this purpose, the fact that the first part of the image inspection algorithm takes a comparatively constant period of time is exploited. This part is at the beginning of the image inspection algorithm. However, there also is a second part for which the required computation time fluctuates to a great extent. Now the concept is to divide this variable part into blocks of time and to estimate the computing time of these blocks of time in advance.

Factors that influence the computing time of the deviation elimination process include:
- the surface area of the surrounding rectangle of a deviation 11, 11a, 11 b: $A_A$
- the number of deviations 11, 11a, 11b: n
- the computing speed of the computing unit 6: m Factors that influence the available computing time are:
- the printing speed Furthermore, two facts are known from analyses using a GPU:

1. Computing time increases approximately linearly with the deviation size.

$$t_s \cong \frac{1}{m} \times A_A$$

2. Computing time increases approximately linearly with the number of deviations. $t_g \cong t_s \times n$ For a serial system such as a single CPU, the total time $t_g$ would be calculated as the total of the computing times of the n deviations 11, 11a, 11b:

$$t_g \sum_{i=0}^{n} \frac{1}{m} \times BlobSize$$

For a parallel system such as a GPU, the computing time is harder to predict if the distribution of the deviations 11, 11a, 11b to the individual cores of the GPU is not actively controlled. Therefore, only a very rough estimate of the computing time may be made for a GPU if the deviations 11, 11a, 11b are randomly allocated to the cores of the GPU. Due to the aforementioned fact, it therefore makes sense to take multiple steps to approximate the actual computing time.

As mentioned above, the sequence of steps is schematically shown in FIG. 5. The inspection algorithm part that takes a comparatively constant amount of time is at the beginning of the algorithm. The second part, which takes an extremely variable amount of time, follows and is divided by the computer 6 into blocks of time the computing period of which is estimated by the computer 6. Then it is checked whether there is enough time for processing the next block. If this is not the case, the algorithm is stopped and the remaining deviations are classified as genuine print defects. In this context, there are two alternatives. Either all deviations 11, 11a, 11 b may be estimated and, based on the estimate, a decision is made whether there is sufficient time to process all deviations 11, 11a, 11b. If not, a decision may be made on which deviations 11, 11a, 11 b are to be processed. Alternatively, the time required for the respective next deviation 11, 11a, 11b is estimated and, if there is enough time for it, the next deviation is analyzed and then the algorithm continues with the next deviation 11, 11a, 11b. FIG. 5 illustrates the latter case.

The following is a brief example for a better understanding. At maximum printing speed, the sheet inspection system has 250 ms of computing time for every camera 5. The constant part of the computations takes 100 ms. At a GPU computing speed of m=16.5 Mpx/s, 5000 deviations that are $100*220$ $px^2$ in size may be calculated in the remaining 150 ms.

In addition, further optimizations are possible. For instance, the constant m could be determined by a short test during every start-up phase of the image recording system 2. This means that it would not have to be defined as a global constant. A further concept is to use the total of the computing times of the cameras 5 per sheet to allocate more computing time to individual image parts.

For example, due to a smaller paper format (edge trimming), the first calculation with camera 0 only takes a total of 190 ms instead of 250 ms. Then the remaining 60 ms might be added to the next camera image inspection so that the next camera 5 would then have 310 ms. If this inspection is then completed in 280 ms, the remaining 30 ms will in turn be transferred to the next camera image inspection until all four camera images have been processed.

The following is a summary list of reference numerals and the corresponding structure used in the above description of the invention:

1 user
2 image recording system
3 control unit
4 printing machine
5 image sensor/camera
6 graphics processing unit
7 display
8, 8a, 8b digital target/reference image
9, 9a, 9b digitally recorded print/camera image
10, 10a, 10b differential image
11, 11a, 11b deviation

The invention claimed is:

1. A method for inspecting printed products of a machine for processing printing substrates, the method comprising:
using at least one image sensor to record and digitize produced printed products and using a computer to analyze the printed products to find potential defects;
using the computer to detect defects in the printed products by comparing the recorded and digitized printed image with a digital reference image, analyzing occurring deviations and marking defective printed products in a manner suitable for removal of the defective printed products;
using the computer to spatially subdivide every digitized printed image into regions with deviations, calculate a time required to analyze every one of the regions, and terminate the analysis of a digitized printed image when the time required to analyze the regions exceeds a predefined value of time per digitized printed image;
carrying out the comparison between the recorded digitized printed image and a digital reference image by creating a differential image between the printed image and the reference image and analyzing the created differential image;
carrying out the spatial subdivision of every digitized printed image into regions with deviations by isolating regions with deviations in the differential image when the differential image is analyzed; and at least one of:
subdividing regions with deviations having a relatively low filling grade in the differential image into individual smaller regions and analyzing the individual smaller regions, or
using the computer to carry out position correction for the individual smaller regions in at least one of the recorded digitized printed image or the reference image, and defining the filling grade by a ratio of pixels with deviations in the differential image relative to a total number of pixels in a surrounding region of a deviation.

2. The method according to claim 1, which further comprises using the computer to calculate the time required to analyze every region immediately before analyzing a region in question, to terminate the analysis of a current digitized printed image when the predefined value of time is exceeded, and to mark deviations in not-yet-analyzed regions as print defects.

3. The method according to claim 1, which further comprises using the computer to calculate the time required for the analysis of all regions before the analysis is started, to only analyze regions in a current digitized printed image for which sufficient time exists regarding the predefined value of time, and to mark the deviations of non-analyzed regions as print defects.

4. The method according to claim 1, which further comprises not further analyzing regions with deviations having a relatively high filling grade in the differential image, marking the deviations having the relatively high filling grade as print defects, and defining the filling grade by the ratio of pixels with deviations in the differential image relative to the total number of pixels in the surrounding region of the deviation.

5. The method according to claim 1, which further comprises implementing the method separately for every one of the at least one image sensors, allowing time saved in the processing of a digitized printed image of an image sensor to be flexibly used by the computer for the processing of a digitized printed image of potential further image sensors.

6. The method according to claim 1, which further comprises providing the at least one image sensor as part of an inline image recording system of a sheet-fed printing machine, using the system to analyze the produced printed sheets as printed products in the sheet-fed printing machine, and using a waste deflector to remove printed sheets having been marked as defective.

* * * * *